United States Patent [19]

Petit

[11] Patent Number: 5,296,200
[45] Date of Patent: Mar. 22, 1994

[54] APPARATUS FOR VENTING EXCESS GAS BUBBLES FROM A BUBBLE CONTACTOR

[75] Inventor: Peter J. Petit, Brookfield, Wis.

[73] Assignee: Envirex Inc., Waukesha, Wis.

[21] Appl. No.: 973,087

[22] Filed: Nov. 6, 1992

[51] Int. Cl.$^5$ .............................................. B01J 10/00
[52] U.S. Cl. ...................................... 422/189; 137/527; 261/121.1; 422/112; 422/194; 435/291; 435/807
[58] Field of Search ........ 422/110, 112, 117, 188–197; 261/14.1, 114.3, 121.1; 222/62, 69; 425/812; 435/291, 808, 818; 55/257.1, 248, 309; 137/527, 434

[56] References Cited

U.S. PATENT DOCUMENTS

| | | |
|---|---|---|
| 1,139,024 | 5/1915 | Frank . |
| 2,160,832 | 6/1939 | Contant . |
| 3,043,433 | 7/1962 | Singer . |
| 3,804,255 | 4/1974 | Speece ........................ 210/194 |
| 3,846,289 | 11/1974 | Jeris et al. . |
| 3,926,588 | 12/1975 | Speece .......................... 55/52 |
| 3,956,128 | 5/1976 | Turner ........................ 210/150 |
| 3,956,129 | 5/1976 | Jeris et al. .................. 210/189 |
| 4,009,098 | 2/1977 | Jeris ............................... 210/3 |
| 4,009,099 | 2/1977 | Jeris ............................... 210/3 |
| 4,009,105 | 2/1977 | Jeris ........................... 210/107 |
| 4,124,508 | 11/1978 | Capetanopoulos ......... 210/194 |
| 4,136,747 | 1/1979 | Mallory et al. .............. 175/66 |
| 4,182,675 | 1/1980 | Jeris ............................... 210/8 |
| 4,246,111 | 1/1981 | Savard et al. ............ 210/96.1 |
| 4,370,151 | 1/1983 | Herbrechtsmeier ......... 55/38 |
| 4,412,924 | 11/1983 | Feather ....................... 210/744 |
| 4,466,928 | 8/1984 | Kos ................................ 261/76 |
| 4,469,599 | 9/1984 | Gros et al. ................. 210/610 |
| 4,477,393 | 10/1984 | Kos ................................ 261/76 |
| 4,507,253 | 3/1985 | Wiesmann .................. 261/22 |
| 4,515,754 | 5/1985 | Stehning ................... 422/168 |
| 4,659,463 | 4/1987 | Chandler et al. ......... 210/202 |
| 4,918,019 | 4/1990 | Guinn ........................ 435/289 |
| 5,011,597 | 4/1991 | Canzoneri et al. ........ 210/104 |

Primary Examiner—Robert J. Warden
Assistant Examiner—Krisanne M. Thornton
Attorney, Agent, or Firm—Michael Best & Friedrich

[57] ABSTRACT

A venting apparatus for bubble contactor employed in liquid treatment apparatus for removing fuel constituents from water. The liquid treatment apparatus includes an oxygenator for dissolving oxygen in the water prior to its introduction into a biological fluid bed reactor to support biological action in the reactor. The oxygenator includes a bubble contactor having a bubble contact chamber, and a venting apparatus for venting the bubble contactor when the bubble swarm in the contact chamber grows too large. The venting apparatus includes a lower valve assembly including a valve having a float mechanism for sensing unacceptable accumulations of gas bubbles in the lower part of the bubble contactor, below the desired lower level of the contact zone. The float also functions to open the valve to release the excess undissolved gas. The valve remains closed under normal conditions when no excessive accumulation of gas bubbles exists in the lower part of the bubble contactor to prevent the needless waste of oxygen.

7 Claims, 3 Drawing Sheets

APPARATUS FOR VENTING EXCESS GAS BUBBLES FROM A BUBBLE CONTACTOR

BACKGROUND OF THE INVENTION

1. Field of the Invention

The invention relates to an apparatus for dissolving gas in liquid, and more particularly to an apparatus for venting a bubble contactor employed to dissolve gas in liquid.

2. Reference to Prior Art

In many processes it is desirable to dissolve gasses in liquids. In one such process an apparatus for dissolving oxygen in water is employed in a water treatment system for removing fuel constituents from water contaminated thereby. The apparatus for dissolving oxygen in water, or "oxygenator", includes a bubble contactor having a degas vessel and a downwardly diverging member extending into the degas vessel for conducting a downflow of water into the degas vessel. The downwardly diverging member defines a bubble contact zone in which oxygen containing bubbles tend to suspend. Excess gas bubbles crowded out of the bubble contact zone escape from the bottom of the downwardly diverging member and ascend to a gas trap at the top of the degas vessel. By routing the gas bubbles in this manner their entry into the outlet of the bubble contactor located near the bottom of the degas vessel is avoided. However, a disadvantage associated with the aforementioned bubble contactor is the complexity of its design.

The oxygenator is also provided with a gas vent system communicating with the gas trap. The vent systems, if left open, results in a continuous gas loss that can be costly since oxygen enriched gases are expensive to produce If the vent system is left closed, excess gas bubbles can accumulate to the extent that they are transferred through the bubble contactor outlet to a downstream fluid bed reactor where they can degrade reactor performance.

Additional examples of oxygenators including gas venting arrangements are provided in U.S. Pat. No. 4,477,393 issued Oct. 16, 1984 to Kos and U.S. Pat. No. 3,926,588 issued Dec. 16, 1975 to Speece. The venting arrangements employed in these examples continually vent gas, resulting in waste of oxygen.

SUMMARY OF THE INVENTION

The invention provides a liquid treatment apparatus having an improved bubble contactor and apparatus for venting the bubble contactor to prevent gas bubbles from escaping into the bubble contactor outlet and traveling downstream to the reactor. The venting apparatus is uncomplicated in construction and operates automatically to vent unacceptable accumulations of gas bubbles in the lower part of the bubble contactor adjacent its outlet. The venting apparatus remains closed at other times to prevent the unnecessary release and waste of undissolved gas.

The invention also provides a liquid treatment apparatus for removing fuel constituents from water or for use in treating waste water such as industrial waste water and municiapl waste water. The liquid treatment apparatus includes an oxygenator for dissolving oxygen in the water prior to its introduction into a biological fluid bed reactor to support biological action in the reactor. The oxygenator includes a bubble contactor having a bubble contact chamber, and a venting apparatus for venting the bubble contactor in the event the bubble swarm in the contact chamber grows too large. The venting apparatus includes a lower valve assembly including a valve having a float mechanism for sensing unacceptable accumulations of gas bubbles in the lower part of the bubble contactor, below the desired lower level of the contact zone. The float also functions to open the valve to release the excess undissolved gas. The valve remains closed under normal conditions when no excessive accumulation of gas bubbles exists in the lower part of the bubble contactor to prevent the needless waste of oxygen.

Other features and advantages of the invention will become apparent to those skilled in the art upon review of the following detailed description, claims and drawings.

Figure 1:
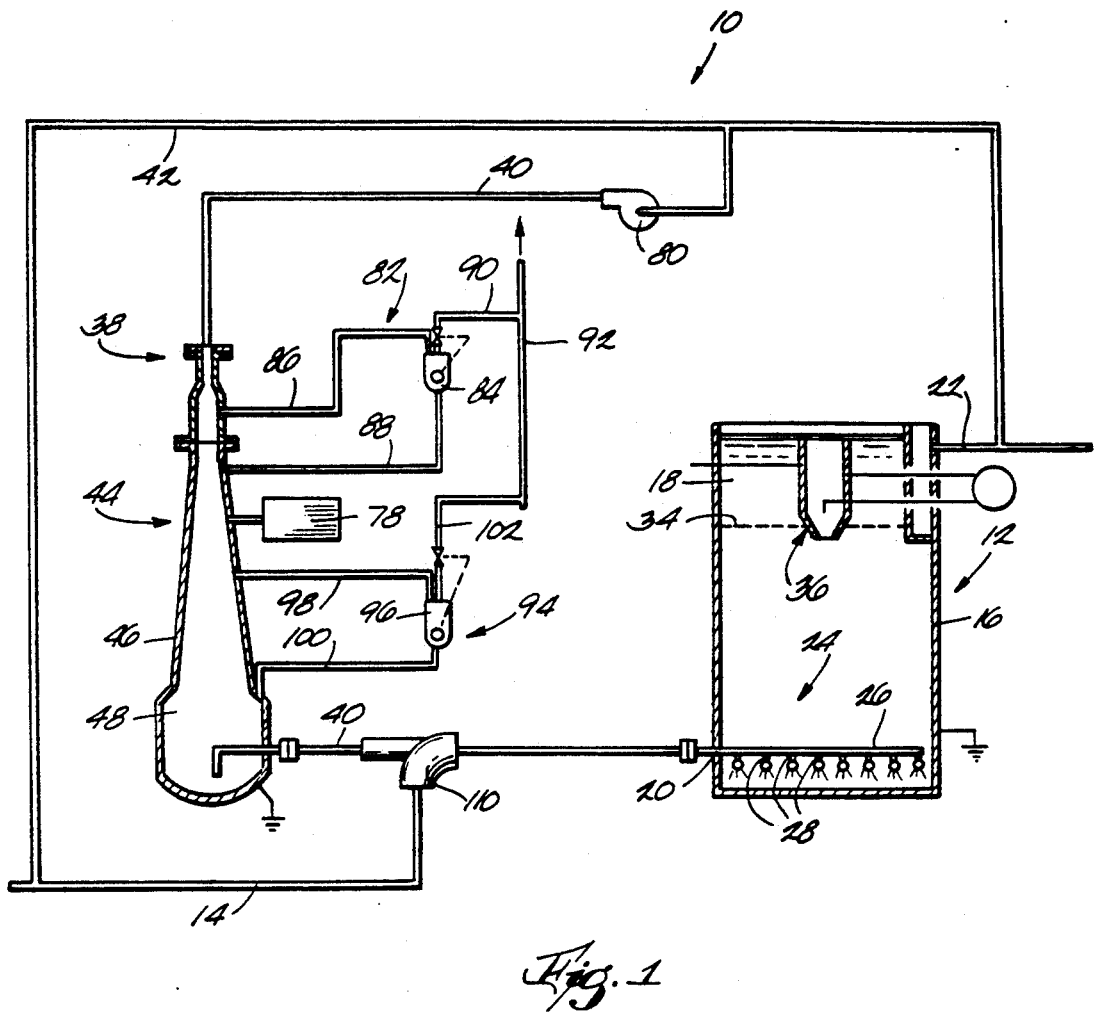
FIG. 1 is a schematic view, partially in section, of a liquid treatment apparatus including a gas dissolution apparatus for dissolving a gas in a liquid.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in FIG. 1 is a liquid treatment apparatus 10 embodying the invention. While the treatment apparatus 10 can be used in other applications, in the embodiment described herein the treatment apparatus 10 is used to remove potentially combustible contaminants including fuel constituents from groundwater tainted by sources such as refineries, leaky underground fuel storage tanks, and the like. The fuel constituents can include, for example, benzene, toluene, ethylbenzene, xylene (BTEXs) and other hydrocarbon compounds. The structure and operation of the liquid treatment apparatus 10 is explained in U.S. patent application Ser. No. 992,742, filed on even date herewith, and titled APPARATUS FOR DISSOLVING GAS IN LIQUID INCLUDING PRESSURIZED BUBBLE CONTACTOR IN SIDESTREAM, the disclosure of which is herein incorporated by reference.

More particularly, in the specific embodiment illustrated in the drawings the liquid treatment apparatus 10 includes a biological fluid bed reactor 12 and a main supply line or conduit 14 for delivering water to be treated to the reactor 12. The reactor 12 includes a reactor tank 16 defining a treatment chamber 18 and including an inlet 20 connected to the main conduit 14 and an outlet 22. The reactor 12 also includes a flow distributor 24 at the base of the reactor tank 16 and including a header member 26 communicating with the inlet 20. The header member 26 is manifolded to a plurality of nozzle studded lateral pipes 28 for delivering water into the treatment chamber 18.

To decontaminate the water flowing through the reactor tank 16, the reactor 12 includes a bed 34 comprised of particulate solids, preferably granular activated carbon, and microorganisms carried on the particulate solids. Under aerobic conditions, the microorganisms consume fuel constituents to decontaminate the water flowing through the reactor 12. To remove excessive biological growth, a suitable growth control system 36 is provided.

The liquid treatment apparatus 10 also includes a gas dissolution apparatus for providing dissolved oxygen to the untreated water in the main conduit 14 to support biological action in the reactor 12. The gas dissolution apparatus 38 includes a source of liquid preferably containing few or no combustible contaminants. While various liquid sources can be used, in the illustrated arrangement the treated effluent of the reactor 12 serves as the liquid source, and the gas dissolution apparatus 38 includes a recycle conduit 40 for delivering recycled treated effluent to the main conduit 14. An optional overflow conduit 42 normally carrying no net flow is also provided.

Figure 2:
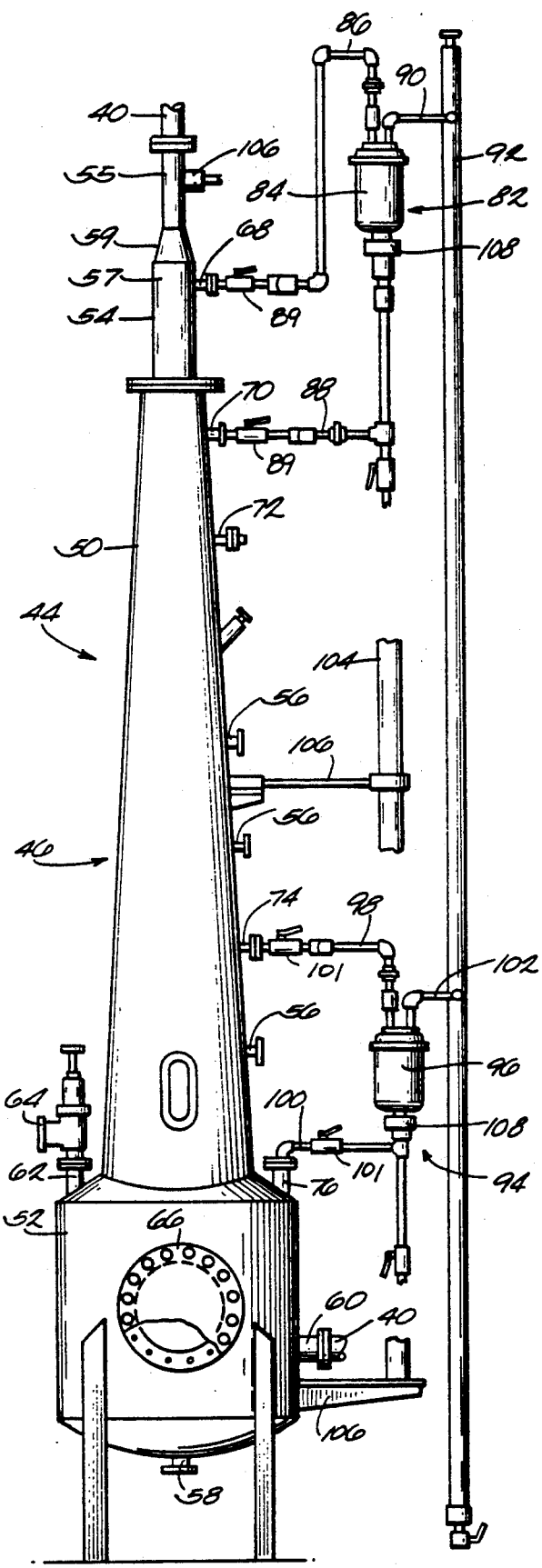
FIG. 2 is a partially cut away enlarged elevational view of part of the gas dissolution apparatus illustrated in FIG. 1.
Figure 3:
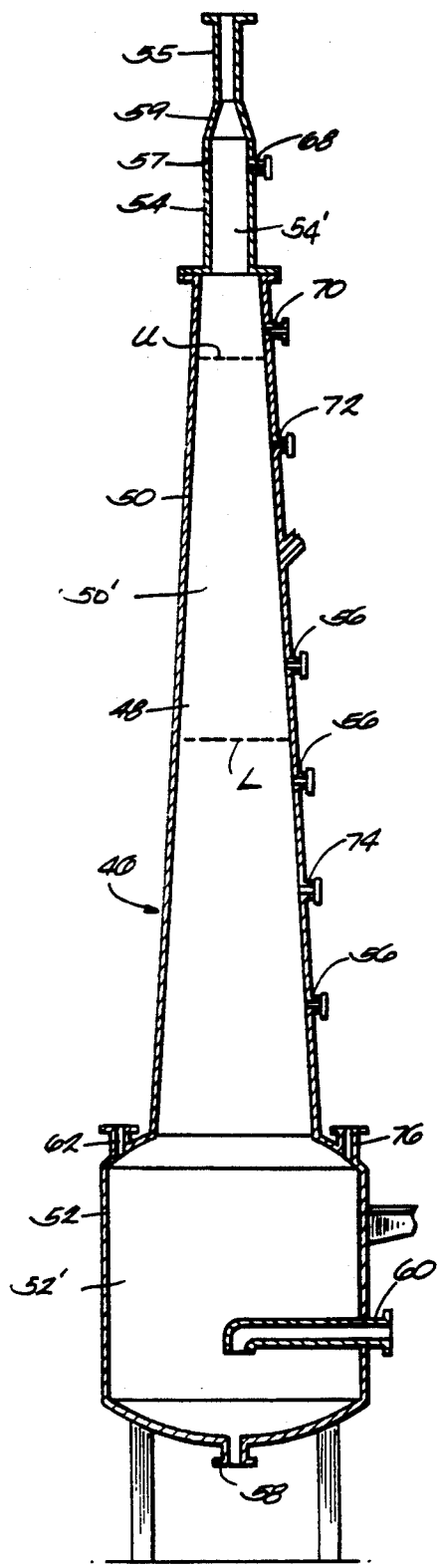
FIG. 3 is a cross-sectional view of the bubble contactor illustrated in FIG. 2 as part of the gas dissolution apparatus.

The gas dissolution apparatus 38 also includes means for dissolving oxygen in the treated effluent flowing through the recycle conduit 40. While various means for dissolving oxygen in the treated effluent can be employed, in the illustrated arrangement such means includes an oxygenator 44 disposed in the recycle conduit 40 between the reactor 12 and the main conduit 14. The oxygenator 44 includes a bubble contactor 46 defining a bubble contact chamber 48 (FIG. 3). As shown in FIGS. 2 and 3, the bubble contactor 46 includes a frustoconically-shaped section 50 which diverges downwardly into an enlarged lower section 52. The bubble contactor 46 also includes a tubular transition member or section 54 connected between the upper end of the section 50 and the recycle conduit 40. The bubble contactor sections 50, 52 and 54 respectively define intermediate, lower and upper chamber sections 50', 52' and 54' (FIG. 3) In the illustrated arrangement the tubular transition member 54 includes an upper end 55 connected to the recycle conduit 40 and having a diameter substantially the same as the recycle conduit. The tubular transition member also includes a lower end portion 57 joined to the upper end of the frustoconically shaped section 50 and having an inner diameter smaller than the inner diameter of the upper end of the frustoconically shaped section 50 but larger than the inner diameter of the recycle conduit 40. The upper end 55 of the tubular transition member is joined to the lower end portion by a tapered or conical section 59. One advantage resulting from the provision of the tubular transition member 54 is that the frustoconically shaped section 50 can be shorter in length.

The bubble contactor 46 also includes a plurality of ports. These ports include monitoring ports 56, a water fill port 58, an outlet port 60 connected to the recycle conduit 40, a relief port 62 on which a relief valve 64 is mounted, and a manhole port 66. For reasons more fully explained below, additional ports 68, 70, 72, 74 and 76 are also provided.

The oxygenator 44 also includes means for introducing oxygen into the bubble contactor 46. While various oxygen introduction means can be employed, in the illustrated arrangement such means includes a gas source 78 (FIG. 1) connected to the port 72 for providing oxygen enriched gas under pressure to the contact chamber 48.

To increase the dissolved oxygen content of the treated effluent entering the main conduit 14, the gas dissolution apparatus 38 also includes means for pressurizing the bubble contactor 46. While various pressurizing means can be employed, in the illustrated arrangement such means includes a pump 80 (FIG. 1) disposed in the recycle conduit 40 between the bubble contactor 46 and the reactor 12.

Due to the downflow velocity profile presented by the bubble contactor 48, gas bubbles introduced by the gas source 78 tend to accumulate in a bubble contact zone wherein the buoyant velocity of the gas bubbles and the downflow velocity of the liquid are at equilibrium. In the illustrated arrangement, the bubble contact zone is generally shown as having upper and lower levels indicated by reference letters U and L, respectively (FIG. 3). While the upper and lower levels U and L of the bubble contact zone can vary, it is preferred that the bubble contact zone not extend beyond the intermediate chamber 50'.

To prevent excessive accumulations of undissolved gas in the bubble contactor 46, the gas dissolution apparatus 38 is provided with a venting apparatus for venting the bubble contactor 46. In particular, while turbulence within the bubble contactor 46 normally prevents bubbles from coalescing to form larger bubbles having a buoyancy sufficient to carry these bubbles above the upper level U, in some instances large gas bubbles do develop. Such a gas bubble or space could result, for example, from the accumulation and coalescence of gasses such as nitrogen that are stripped from the treated effluent during the oxygenation process This gas space can also potentially include oxygen gas and residual fuel constituents stripped from the treated effluent.

Figure 4:
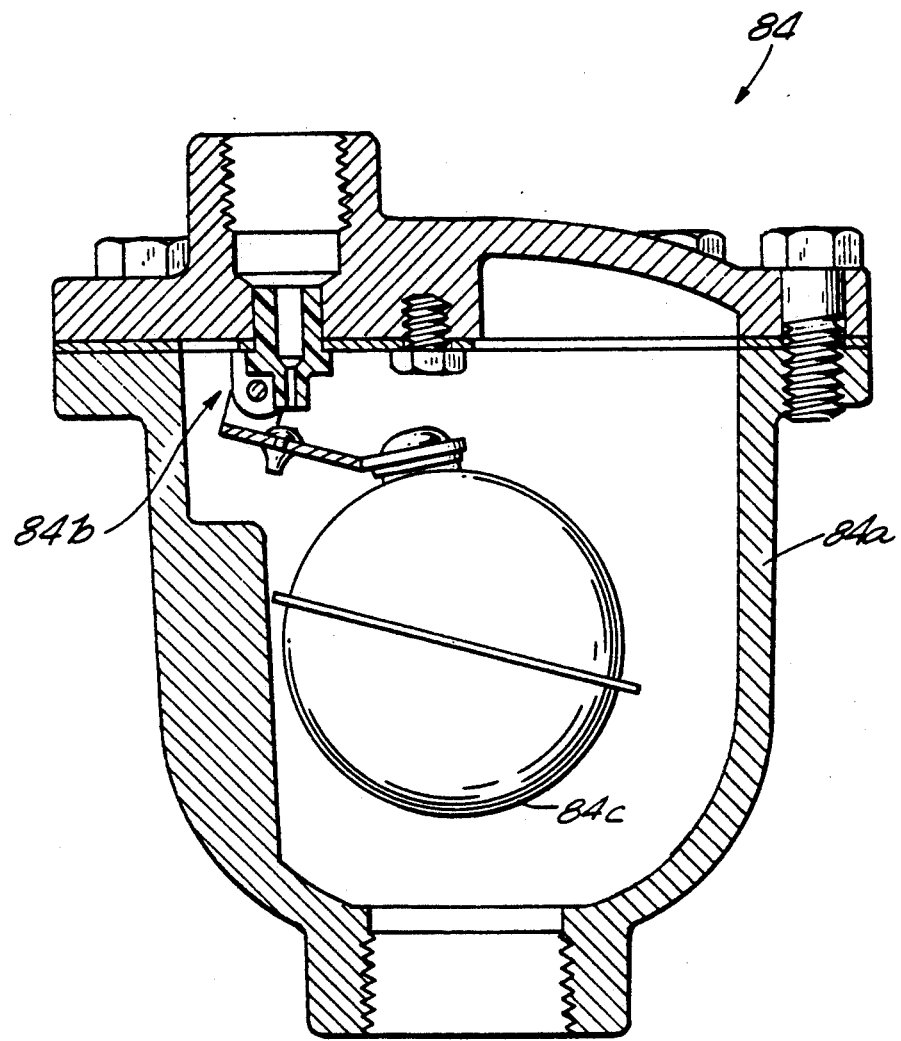
FIG. 4 is a partially sectional view of a float-operated valve employed as part of the gas dissolution apparatus to vent the bubble contactor.

Accordingly, the venting apparatus includes an upper vent assembly 82 including means for sensing the existence of a gas space extending into the upper chamber section 54' and means cooperating with the sensing means for venting the bubble contactor 46 responsive to the existence of the gas space. In the embodiment illustrated in the drawings, the upper vent assembly 82 includes an air release valve 84 that incorporates both the gas space sensing means and the venting means. A suitable valve is illustrated in FIG. 4, wherein the valve 84 is a float-operated valve and includes a valve body 84a supporting a valve mechanism 84b that is opened and closed through movement of a float 84c. The illustrated valve 84 is produced by Val-Matic Valve and Manufacturing Corp., Elmhurst, Ill.

The upper vent assembly 82 also includes conduits 86 and 88 connecting the upper and lower parts of the valve 84 to the ports 68 and 70 so that the valve 84 communicates with the upper and intermediate chamber sections 54' and 50', respectively. The conduits 86 and 88 are provided with ball values 89 to close off the upper vent assembly 82 for purposes such as maintenance. A conduit 90 is also provided to connect the valve 84 to a vent conduit 92. When a gas space develops in the upper chamber section 54', the float 84c descends to automatically open the valve 84 to vent the gas space through the vent conduit 92. The valve 84 remains closed at other times to minimize the loss of oxygen. The vented gas is preferably passed through a carbon canister (not shown) in the vent conduit 92 before being disposed of.

The venting apparatus also includes a lower vent assembly 94 to vent excessive accumulations of undissolved gas bubbles which extend below the lower level L of the bubble contact zone and into the lower chamber section 52'. The lower vent assembly 94 includes means for sensing undissolved gas in the lower chamber section 52' and means for venting the bubble contactor 46 responsive to the existence of such a gas build-up. In the illustrated embodiment, the lower vent assembly 94 includes an air release valve 96 which is preferably identical to the valve 84 and which incorporates both the sensing means and the venting means. The lower vent assembly 94 also includes conduits 98 and 100 connecting the upper and lower parts of the valve 96 to the ports 74 and 76 so that the valve 96 communicates with the intermediate and lower chamber sections 50' and 52', respectively. The conduits 98 and 100 are also provided with ball valves 101. A conduit 102 connects the valve 96 to the vent conduit 92. Like the upper valve 84, the lower valve 96 opens to vent the system only when a concentration of gas bubbles sufficient to permit the float to open the valve 96 is present in the lower part of the bubble contactor 46. The valve 96 remains closed at other times.

Means are provided for supporting the upper and lower vent assemblies 82 and 94. While various support means can be employed, in the illustrated arrangement the support means includes a vertical support channel 104 and a plurality of support members 106 for supporting the support channel 104 on the bubble contactor 46. Brackets 108 are provided to mount the valves 84 and 96 on the support channel 104.

The gas dissolution apparatus 38 also includes means for mixing the pressurized and oxygenated treated effluent in the recycle conduit 40 with the relatively low pressure untreated water in the main conduit 14. In the illustrated arrangement the mixing means includes a mixing device 110 for simultaneously diluting and depressurizing the treated effluent in the recycle conduit 40 to accomplish quick, turbulent mixing with the untreated water in the main conduit 14. As shown in FIG. 1, the mixing device 110 is positioned at the juncture of the recycle conduit 40 and the main conduit 14. The operation and construction of the mixing device 110 are fully set forth in aforementioned U.S. patent application Ser. No. 972,742.

In operation, the liquid treatment apparatus 10 is supplied with water containing relatively low quantities of dissolved oxygen. This water is pumped through the main conduit 14 to the reactor 12 for treatment. Prior to entering the reactor 12, the water in the main conduit 14 is provided with dissolved oxygen. This is accomplished by recycling some of the treated effluent being discharged from the reactor 12 and pumping this recycled liquid through the oxygenator 44 to increase its dissolved oxygen content before reintroducing it into the main conduit 14 via the mixing device 110. In the event of formation of a gas space in the upper chamber section 54', the upper vent assembly 82 will function to automatically vent the gas space, as previously described. Similarly, any excessive accumulation of undissolved gas in the lower chamber section 52' is automatically vented by the lower vent assembly 94 to prevent gas bubbles from passing through to the reactor 12.

Advantageously, the lower vent assembly 94 is automatically operable to vent the lower part of the bubble contact chamber 48 responsive to unacceptable accumulations of gas bubbles therein to substantially prevent the gas bubbles from reaching the reactor 12. Also, since the upper vent assembly 94 opens only when needed, the continual venting of gas and possible waste of oxygen is avoided. An addition to these advantages, the vent assembly 94 is used with a simply constructed downflow bubble contactor.

Various features and advantages of the invention are set forth in the following claims.

I claim:

1. A liquid treatment apparatus comprising
a reactor,
a conduit connected to said reactor for delivering liquid to the reactor,
means for dissolving gas in the liquid, said means for dissolving gas including a bubble contactor disposed in said conduit, said bubble contactor defining a chamber having a lower chamber section, and an intermediate chamber section diverging downwardly into said lower chamber section, said intermediate chamber section including a bubble contact zone, said bubble contact zone having a lower level, and
valve means connected to said bubble contactor for venting excessive accumulations of gas bubbles that extend below the bubble contact zone and into the lower chamber section, said valve means including means for sensing the existence of undissolved gas in the lower chamber section, and means for selectively venting said lower chamber section responsive to the means for sensing the existence of the undissolved gas in the lower chamber section, said means for selectively venting including a float-operated valve communicating with said intermediate chamber section at a level below the lower level of the bubble contact zone and with said lower chamber section, said float-operated valve being positioned above said lower chamber section, and said means for sensing including the float for said float-operated valve, said float being operable to open said float operated valve when undissolved gas exists in said lower chamber section.

2. An apparatus for dissolving gas in liquid comprising
a bubble contactor defining a chamber having a bubble contact zone and a lower chamber section below said bubble contact zone, said bubble contact including a liquid outlet communicating with said lower chamber section,
means for introducing a gas into said chamber, and
means connected to said bubble contactor for preventing undissolved gas from exiting the bubble contactor through said liquid outlet, said means for preventing undissolved gas from exiting the bubble contactor including means for sensing the existence of undissolved gas in said lower chamber section, and means for selectively venting said lower chamber portion responsive to the means for sensing the existence of the undissolved gas in said lower chamber section.

3. An apparatus for dissolving gas in liquid as set forth in claim 2 wherein said means for venting includes a float-operated valve, and wherein said means for sensing includes the float for said valve, said float being operable to open said valve when undissolved gas exits in said lower chamber section.

4. An apparatus for dissolving gas in liquid as set forth in claim 2 wherein said chamber includes an intermediate chamber section diverging downwardly to said lower chamber section, said intermediate section including said bubble contact zone, and wherein said means for venting includes a valve communicating with said intermediate chamber section and with said lower chamber section.

5. An apparatus for dissolving gas in liquid as set forth in claim 4 wherein said bubble contact zone includes a lower level, and wherein said valve communicates with said intermediate chamber section at a level below the lower level of said bubble contact zone.

6. An apparatus for dissolving gas in liquid as set forth in claim 2 wherein said means for selectively venting includes a float-operated valve positioned above said lower chamber section, and wherein said means for sensing includes the float of said float-operated valve.

7. A liquid treatment apparatus for removing potentially combustible contaminants from a liquid, said liquid treatment apparatus comprising a fluid bed reactor including means for removing, under aerobic conditions, potentially combustible contaminants from a liquid, a conduit connected to said reactor for delivering the liquid to the reactor, means for dissolving oxygen in the liquid, said means for dissolving oxygen including a bubble contactor disposed in said conduit, said bubble contactor defining a chamber having a lower chamber section and an intermediate chamber section diverging downwardly to said lower chamber section, said intermediate chamber section including a bubble contact zone having a lower level, and means for preventing undissolved gas from exiting the bubble contactor, said means for preventing undissolved gas from exiting the bubble contactor including a float-operated valve positioned above said lower chamber section, said float-operated valve including an upper portion communicating with said intermediate chamber section, said upper portion of said float-operated valve communicating with said intermediate chamber section at a level below the lower level of said bubble contact zone, a lower portion communicating with said lower chamber section, and means including the float of said float-operated valve for sensing undissolved gas in said lower chamber section, said float being operable to open said float-operated valve when undissolved gas is present in said lower chamber section.

* * * * *

UNITED STATES PATENT AND TRADEMARK OFFICE
CERTIFICATE OF CORRECTION

PATENT NO. : 5,296,200
DATED : March 22, 1994
INVENTOR(S) : Peter J. Petit

It is certified that error appears in the above-identified patent and that said Letters Patent is hereby corrected as shown below:

In Claim 2, Col. 6, Ln. 50 "contact" should read --contactor--;
Ln. 60 "portion" should read --section--.

In Col. 1, Ln. 36 a period, --.--, should follow "produce".

In Col. 2, Ln. 56 "992,742" should read --972,742--.

In Col. 3, Ln. 45 a period, --.--, should follow "(FIG. 3)".

Signed and Sealed this

Nineteenth Day of July, 1994

Attest:

BRUCE LEHMAN

*Attesting Officer*  *Commissioner of Patents and Trademarks*